United States Patent [19]

Flaum et al.

[11] Patent Number: 4,909,075

[45] Date of Patent: Mar. 20, 1990

[54] METHOD FOR DETERMINING FORMATION CHARACTERISTICS WITH ENHANCED STATISTICAL PRECISION WITHOUT DEGRADING THE VERTICAL RESOLUTION OR WITH ENHANCED VERTICAL RESOLUTION

[75] Inventors: Charles Flaum, Houston; James E. Galford, Sugarland, both of Tex.; Steven W. Duckett, Los Altos Hills, Calif.

[73] Assignee: Schlumberger Technology Corporation, Houston, Tex.

[21] Appl. No.: 405,396

[22] Filed: Sep. 7, 1989

Related U.S. Application Data

[60] Continuation of Ser. No. 290,797, Dec. 28, 1988, abandoned, which is a continuation-in-part of Ser. No. 164,367, Mar. 3, 1988, Pat. No. 4,794,792, which is a division of Ser. No. 915,439, Oct. 3, 1986, Pat. No. 4,786,796.

[51] Int. Cl.$^4$ .............................................. E21B 47/00
[52] U.S. Cl. .................................... 73/152; 250/266
[58] Field of Search ................ 73/152; 324/339, 357, 324/362; 250/262, 264, 265, 266, 269

[56] References Cited

U.S. PATENT DOCUMENTS

| | | | |
|---|---|---|---|
| 3,406,359 | 10/1968 | Welz et al. | 324/1 |
| 3,493,849 | 2/1970 | Doll | 324/1 |
| 3,823,319 | 7/1974 | Tittman | 250/265 |
| 4,047,027 | 9/1977 | Bateman et al. | 250/264 |
| 4,092,536 | 5/1978 | Smith | 250/265 |
| 4,170,732 | 10/1979 | Randall | 250/266 X |
| 4,350,887 | 9/1982 | Barnard et al. | 250/265 |
| 4,379,228 | 4/1983 | Allen | 250/264 |
| 4,423,323 | 12/1983 | Ellis et al. | 250/264 |
| 4,486,836 | 12/1984 | Lacour-Gayet | 364/422 |
| 4,535,625 | 8/1985 | Lyle, Jr. | 73/152 |

Primary Examiner—Jerry W. Myracle
Attorney, Agent, or Firm—Henry N. Garrana; John H. Bouchard

[57] ABSTRACT

A method for determining a characteristic of a subsurface geological formation enhances the vertical resolution of dual-detector measurements by utilizing a continuous calibration factor which is obtained from an environmentally compensated characteristic derived from at least two resolution-matched sensor signals, and from a resolution-matched sensor signal from the near-detector of the tool. This method also can enhance the statistical precision of the characteristic without degrading the vertical resolution.

71 Claims, 4 Drawing Sheets

METHOD FOR DETERMINING FORMATION CHARACTERISTICS WITH ENHANCED STATISTICAL PRECISION WITHOUT DEGRADING THE VERTICAL RESOLUTION OR WITH ENHANCED VERTICAL RESOLUTION

This is a continuation of Ser. No. 290,797 filed December 28, 1988 now abandoned, which is a Continuation-in-Part of Ser. No. 164,367 filed March 3, 1988 now U.S. Pat. No. 4,794,792 which was a Divisional of Ser. No. 915,439 filed October 3, 1986, now U.S. Pat. No. 4,786,796.

1. Field of the Invention

The invention relates to a method for determining a characteristic of a subsurface geological formation traversed by a borehole, wherein the vertical resolution of dual-detector measuerments are enhanced. Additionally, statistical precision is enhanced without degrading the vertical resolution.

2. Description of the Prior Art.

Various characteristics of subsurface geological formations are determined through use of various types of logging tools which employ dual detectors, or signal sensors, and a signal source. Typically, the detectors, or signal sensors, are spaced from the signal source by different distances. The signal source transmits a signal into the subsurface geological formation, which signal is received by the signal sensors, or detectors.

For example, porosity measurements in a subsurface geological formation are generally performed by a dual-detector neutron porosity logging tool provided with a neutron-emitting source, or signal source, which continuously irradiates the formation under study. The resulting neutron population is sampled by a pair of neutron detectors, or signal sensors, spaced at different distances from the source. If the two-detector measurement is made at a sufficient distance from the signal source, the effect of borehole size and tool standoff are minimized by taking the ratio of the counting rates of the respective detectors. The ratio of conting rates from the detectors provides the basic tool response from which a porosity index, or ratio porosity, is obtained.

Each of the detectors, or signal sensors, has a different vertical resolution because of the different spacings of the detectors, or signal sensors, from the signal source. Unwanted contributions to the ratio porosity include contributions from elements of the environment of the investigation such as tool standoff, borehole size, mud cake thickness, borehole salinity, formation salinity, mud weights, etc. Unfortunately, unless using a signal source many orders of magnitude stronger than the largest now in use, the detectors of a dual-detector neutron tool must be located at shorter spacings than would otherwise be chosen. Unfortunately, full advantage of large source-detector spacing cannot be realized in practice. If the detectors are placed far enough from the source, the counting rates become unacceptably low. As a result, shorter source-detector spacings than the ideal are employed. As a consequence of the shorter source-detector spacings, the two registered counting rates are affected by porosity changes in slightly different ways. Hence, the porosity value derived from the ratio of these counting rates does not always reflect the true formation porosity.

The main advantage of ratio processing is that the resulting porosity is less affected by environmental factors than a porosity obtained from a single detector. However, such tools do not utilize two important features of certain types of dual-detector neutron porosity logging tools: the difference in the vertical resolution of the near and far detectors, or signal sensors, and the better statistical behavior of the near detector. Because of its distance from the signal source, the near detector is nearly twice as sensitive as the far detector to contrasts in porosity at bed boundaries and the near detector produces a higher count rate.

Another type of logging tool which utilizes two detectors is a dual-detector gamma radiation bulk density tool which is useful in determining the density of a subsurface geological formation. The density may be determined from the count rates of two detectors located at two different spacings from a common gamma radiation source. The dual detector gamma radiation bulk density tool likewise has a near detector which is more sensitive to bed boundaries than the far detector and may have a better statistical behavior.

In most cases, to maintain adequate statistical precision at reasonable logging speed, the results are filtered by averaging data at several depth levels. Although this improves statistical precision, the results suffer from a degradation in vertical resolution.

Accordingly, prior to the development of the present invention, there has been no method for determining a characteristic of a subsurface geological formation utilizing a dual-detector logging tool, which method utilizes the increased sensitivity in vertical resolution of the near detector and the better statistical behavior of the near detector. Therefore, the art has sought a method for determining a characteristic of a subsurface geological formation wherein the vertical resolution of the characteristic of a formation is enhanced by utilizing the better vertical resolution and statistical behavior of the near detector. Additionally, statistical precision is enhanced without degrading the vertical resolution. Furthermore, the art has sought a method for determining a characteristic of a subsurface geological formation which does not require any additional or new measurements to be made, whereby logging data from older wells can easily be reevaluated through such method.

SUMMARY OF THE INVENTION

In accordance with the invention, the foregoing advantages have been achieved through the present method for determining the density of a subsurface geological formation traversed by a borehole. The present invention includes the steps of: (a) passing a logging tool through the borehole, the logging tool having associated therewith a signal source and at least two signal sensors spaced from the signal source by different distances; (b) transmitting a signal from the signal source into the subsurface geological formation; (c) generating sensor signals from the at least two signal sensors in response to the signal from the signal source received by the at least two signal sensors; (d) matching the vertical resolution of the generated sensor signals from the at least two signal sensors; (e) determining an environmentally compensated density from the at least two resolution matched sensor signals; (f) determining the density from the unmatched sensor signal from the signal sensor spaced the least distance from the signal source; (g) determining the density from the resolution matched sensor signal from the signal sensor spaced the least distance from the signal source; (h) determining the difference between the density of step (e) and density of step (g); and (i) combining the result of step (h)

with the density of step (f) to determine the density, wherein the vertical resolution of the density is enhanced. Another feature of the present invention is the step of generating a tangible representation of the determined density having enhanced vertical resolution.

The present invention for determining density also includes the preferred methods of: (a) passing a logging tool through the borehole, the logging tool having associated therewith a signal source and at least two signal sensors spaced from the signal source by different distances; (b) transmitting a signal from the signal source into the subsurface geological formation; (c) generating sensor signals from the at least two signal sensors in response to the signal from the signal source received by the at least two signal sensors; (d) matching the vertical responses of the generated sensor signals from the at least two signal sensors by appropriate filters; (e) determining an environmentally compensated density from the at least two response matched sensor signals; (f) determining the density from the response matched sensor signal from the signal sensor spaced the least distance from the signal source; (g) determining an estimate of compensated density with degraded vertical resolution but improved statistics by filtering the estimate from (e); (h) filtering the near detector density estimate in (f) to match the vertical response of the filtered compensated density from (g); (i) determining the difference between the density of step (g) and density of step (h); and (j) combining the result of step (i) with the density of step (f) to determine the density, wherein the statistical precision of the density is enhanced, without degrading the vertical resolution. Another feature of the present invention is the step of generating a tangible representation of the determined density having enhanced statistical precision.

In accordance with the invention, a method for determining the porosity index of a subsurface geological formation traversed by a borehole is also disclosed. The present invention includes the steps of: (a) passing a logging tool through the borehole, the logging tool having associated therewith a signal source and at least two signal sensors spaced from the signal source by different distances; (b) transmitting a signal from the signal source into the subsurface geological formation; (c) generating sensor signals from the at least two signal sensors, in response to the signal from the signal source received by the at least two signal sensors; (d) matching the vertical resolution of the generated sensor signals from the at least two signal sensors; (e) determining an environmentally compensated porosity index from the at least two resolution matched sensor signals; (f) determining a continuous calibration factor utilizing the environmentally compensated porosity index of step (e) and the resolution matched sensor signal from the signal sensor spaced the least distance from the signal source; (g) calibrating the unmatched sensor signal from the signal sensor spaced the least distance from the signal source by applying the continuous calibration factor thereto; and (h) determining a porosity index from the calibrated, unmatched sensor signal of step (g), wherein the vertical resolution of the porosity index is enhanced. Another feature of the present invention is the step of generating a tangible representation of the determined porosity index having enhanced vertical resolution.

The present invention for determining porosity also includes the preferred method of: (a) passing a logging tool through the borehole, the logging tool having associated therewith a signal source and at least two signal sensors spaced from the signal source by different distances; (b) transmitting a signal from the signal source into the subsurface geological formation; (c) generating sensor signals from the at least two signal sensors, in response to the signal from the signal source received by the at least two signal sensors; (d) matching the vertical resolution of the generated sensor signals from the at least two signal sensors; (e) determining an environmentally compensated porosity index from the at least two resolution matched sensor signals; (f) filtering the compensated porosity index from (e) to improve statistical precision but with degraded vertical resolution; (g) filtering additionally the sensor signal from the signal sensor spaced the least distance from the source to match the degraded vertical resolution of the compensated porosity from (f); (h) determining a continuous calibration factor utilizing the environmentally compensated porosity index of step (f) and the additionally filtered sensor signal from the signal sensor spaced the least distance from the signal source from (g); (i) calibrating the matched sensor signal from the signal sensor spaced the least distance from the signal source by applying the continuous calibration factor thereto; and (j) determining a porosity index from the calibrated, matched sensor signal of step (i), wherein the statistical precision of the porosity index is enhanced without degrading vertical resolution. Another feature of the present invention is the step of generating a tangible representation of the determined porosity index having enhanced statistical precision.

In accordance with the invention, a method for determining a characteristic of a subsurface geological formation traversed by a borehole is also disclosed. The present invention includes: (a) passing a logging tool through the borehole, the logging tool having associated therewith a signal source and at least two signal sensors spaced from the signal source by different distances; (b) transmitting a signal from the signal source into the subsurface geological formation; (c) generating sensor signals from the at least two signal sensors, in response to the signal from the signal source received by the at least two signal sensors; (d) matching the vertical resolution of the generated sensor signals from the at least two signal sensors; (e) determining an environmentally compensated characteristic of the subsurface geological formation from a combination of the resolution matched sensor signals; (f) determining a continuous calibration factor by utilizing the environmentally compensated characteristic of step (e) and the resolution matched sensor signal from the signal sensors spaced the least distance from the signal source; (g) calibrating the unmatched sensor signal from the signal sensor spaced the least distance from the signal source with the continuous calibration factor; and (h) determining the desired characteristic from the calibrated unmatched signal sensor of step (g), wherein the vertical resolution of the desired characteristic is enhanced.

A preferred method for determining a characteristic of a subsurface geological formation includes: (a) passing a logging tool through the borehole, the logging tool having associated therewith a signal source and at least two signal sensors spaced from the signal source by different distances; (b) transmitting a signal from the signal source into the subsurface geological formation; (c) generating sensor signals from the at least two signal sensors, in response to the signal from the signal source received by the at least two signal sensors; (d) matching the vertical resolution of the generated sensor signals from the at least two signal sensors; (e) determining an environmentally compensated characteristic of the subsurface geological formation from a combination of the resolution matched sensor signals; (f) filtering the result from (e) to improve statistical precision but degrading vertical resolution; (g) filtering additionally the near measurement to match the degraded vertical resolution of the filtered compensated characteristic from (f); (h) determining a continuous calibration factor by utilizing the filtered environmentally compensated characteristic of step (f) and the filtered sensor signal from the signal sensor spaced the least distance from the signal source from (g); (i) calibrating the sensor signal from the signal sensor spaced the least distance from the signal source with the continuous calibration factor from step (d); and (j) determining the desired characteristic from the calibrated signal sensor of step (i), wherein the statistical precision of the desired characteristic is enhanced without degrading the vertical resolution.

A further feature of the present invention includes the step of generating a tangible representation of the determined characteristic having enhanced vertical resolution/and statistical precision. Another feature of the present invention is that the vertical resolution of the generated sensor signals from the at least two signal sensors may be matched by passing at least one of the generated sensor signals through a filter.

A further feature of the present invention resides in the fact that the generated sensor signal of the signal sensor spaced the least distance from the signal source may be passed through the filter. The characteristic to be determined may be the density of the subsurface geological formation; and the environmentally compensated characteristic may be an environmentally compensated density. The characteristic to be determined may also be the porosity index of the subsurface geological formation; and the environmentally compensated characteristic may be an environmentally compensated porosity index. A further feature of the present invention is that the continuous calibration factor may be utilized to indicate the presence of gas in the geological formation, or to indicate logging conditions in the borehole.

The method for determining a characteristic of a subsurface geological formation traversed by a borehole of the present invention, as compared with previously proposed prior art methods, has the advantages of enhancing the vertical resolution of the characteristic by utilizing the better vertical resolution of the near detector to better illustrate contrast in the characteristic at bed boundaries; and does not require additional logging measurements, whereby logging data from older wells can be re-evaluated.

Additionally, the method has the advantage of enhancing the statistical precision of the characteristic by utilizing the better vertical resolution and statistical precision of the near detector to allow faster logging speeds thereby significantly reducing cost of operation and does not require additional logging measurements, whereby logging data from older wells can be re-evaluated.

Although the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION.

Figure 1:
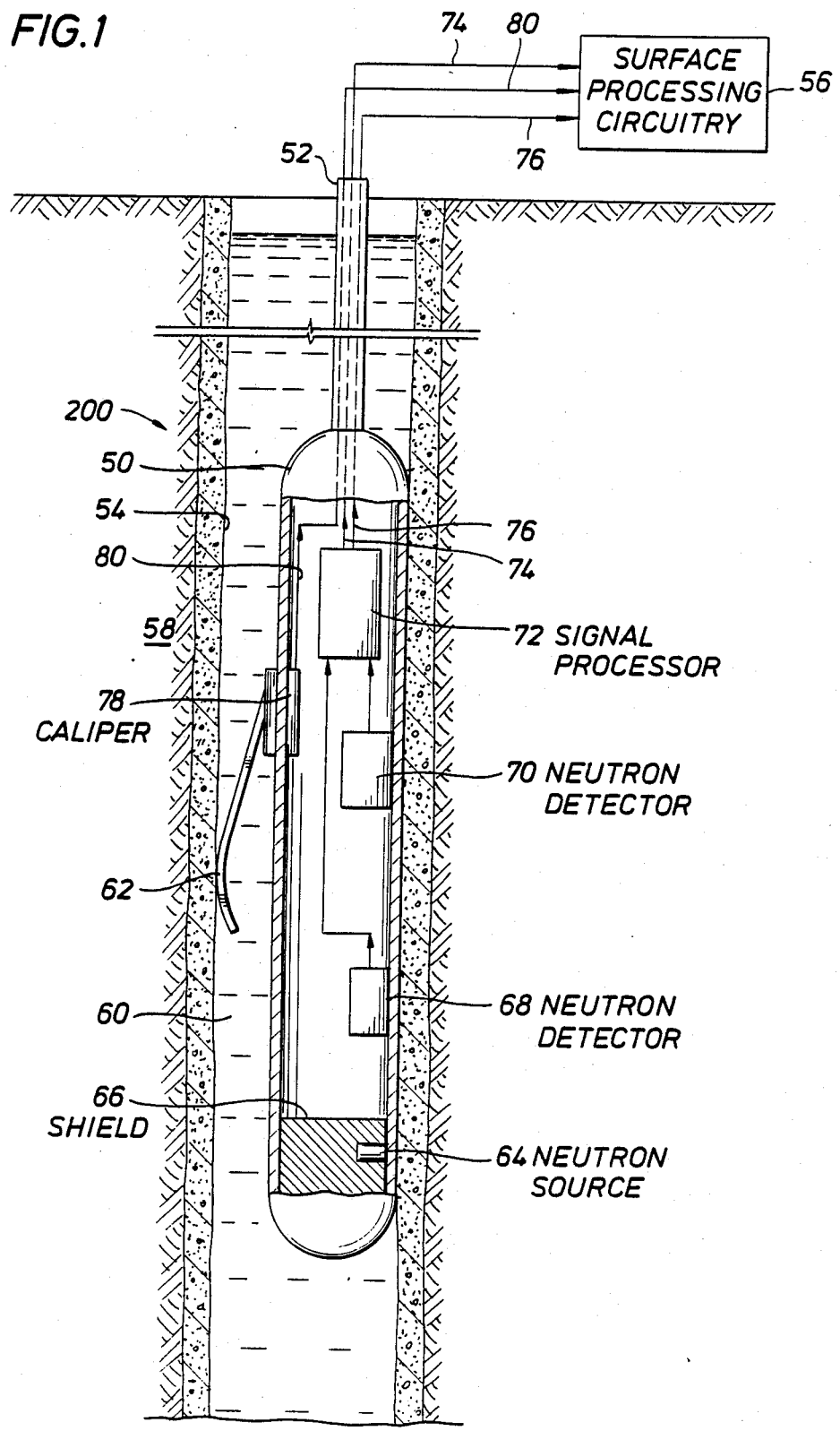
FIG. 1 is a schematic diagram of a dual-detector tool useful in practicing the methods of the present invention.

In FIG. 1, a representative dual-detector logging tool is illustrated. Logging tool 200, is preferably a compensated neutron logging tool, or dual-detector neutron tool, when the method of the present invention is utilized to determine a porosity index of a subsurface geological formation 58 traversed by a borehole 54. A fluid-tight pressure resistant housing 50 is suspended by an armored cable 52 in a borehole 54. Cable 52 comprises insulated conductors that electrically connect the equipment within the housing 50 with surface processing circuitry 56 at the earth surface. A winch (not shown) is located at the surface and is used to lower and raise the housing 50 of logging tool 200 in the borehole 54 to traverse subsurface geological formations 58.

The borehole 54 may be dry or may be filled with drilling mud 60, as shown. To reduce the influence of the mud 60, a decentralizing mechanism, for example, a resiliently activated arm 62, may be pivotally attached to the housing 50 and urges its opposite side against the borehole wall to prevent the mud 60 from intervening between housing 50 and formation 58.

A neutron source, or signal source 64, having a yield of typically $4 \times 10^7$ n/sec, is placed in the lower most end of the housing 50 adjacent to the side that abuts the formation 58. The source, or signal source, 64 may be any conventional neutron source utilized in logging tools 200, such as a "chemical" neutron source, for example, a mixture of plutonium and beryllium or americium and beryllium. Alternatively, neutron source 64 may comprise a neutron generator of the ion accelerator type. Because these sources 64 are isotropic, and emit neutrons with equal probability in all directions, a copper neutron shield 66 may be placed around most of the source 64, except, of course, the side adjacent to the borehole wall. Such a shield thus scatters the largest possible number of neutrons toward the adjacent portion of the formation 58 and thereby enhances the statistical accuracy of the measurements.

A signal, or neutrons, are transmitted, or emitted, from the neutron source, or signal source, 64 and diffuse through the formation 58. The neutrons are then registered by a short-spaced neutron detector, 68, and a long-spaced neutron detector 70 which are mounted within the housing above and generally in line with, the source 64. Typically, the near and far detectors, 68, 70 or signal sensors, each comprise a hollow cylindrical cathode filled with a neutron sensitive gas. An anode wire (not shown) in the center of the cylinder creates a voltage gradient through the gas-filled cylinder, that enables ionized nuclear particles, produced as a consequence of neutron absorption within the gas nuclei to establish charged pulses in the detector electrodes. The long-spaced, or far, detector, or signal sensor 70 has a much larger volume than the short-spaced, or near, detector, or signal sensor, 68, in order to be more sensitive to neutrons. This arrangement of detectors having different sensitivities is provided to compensate for the exponential decrease in neutron population with an increased distance separation from the signal source 64.

It should be noted that the use of the terms "near-detector", "short-spaced" detector, or signal sensor "spaced the least distance from the signal source" are used to describe a detector conventionally used in a logging tool, such as logging tool 200, wherein the spacing of the detector, or signal sensor 68, from the signal source 64 is an optimum compromise between the ability of the detector to measure the desired characteristic of the formation 58, while providing the best vertical resolution of the desired signal from the signal sensor. In other words, if the detector is spaced too close to the source 64, the desired measurement cannot be made. Further, the foregoing terms are not intended to encompass non-functional or non-operative detectors.

Pulses, or sensor signals, from the detectors 68 and 70 are passed to a downhole signal processor circuit 72 for transmission to the surface processing circuitry 56 through two conductors 74 and 76, respectively, in the armored cable 52, after discrimination against noise and amplification in a conventional manner. A borehole size indication may be obtained from caliper 78 combined with the decentralizing arm 62. The caliper 78 may transmit to the surface equipment 56, through a conductor 80 in the cable 52, signals that represent the borehole diameter in a conventional manner.

Were the desired formation characteristic to be determined, for the subsurface geological formation 58, to be the density thereof, logging tool 200 would preferably be a dual-detector gamma radiation bulk density tool, as is conventional in the art. Such a dual-detector gamma radiation bulk density tool 200 would likewise have near and far detectors, or signal sensors, 68, 70 which would cooperate with a gamma radiation source 64, as is known in the art. Similar pulses, or sensor signals, would be generated from the two detectors, or signal sensors, 68, 70 and would be sent to a downhole signal processor circuit 72 for transmission to the surface processing circuitry 56 through two conductors 74 and 76, respectively, in the armored cable 52 after discrimination against noise and amplification, in a conventional manner.

Figure 2:
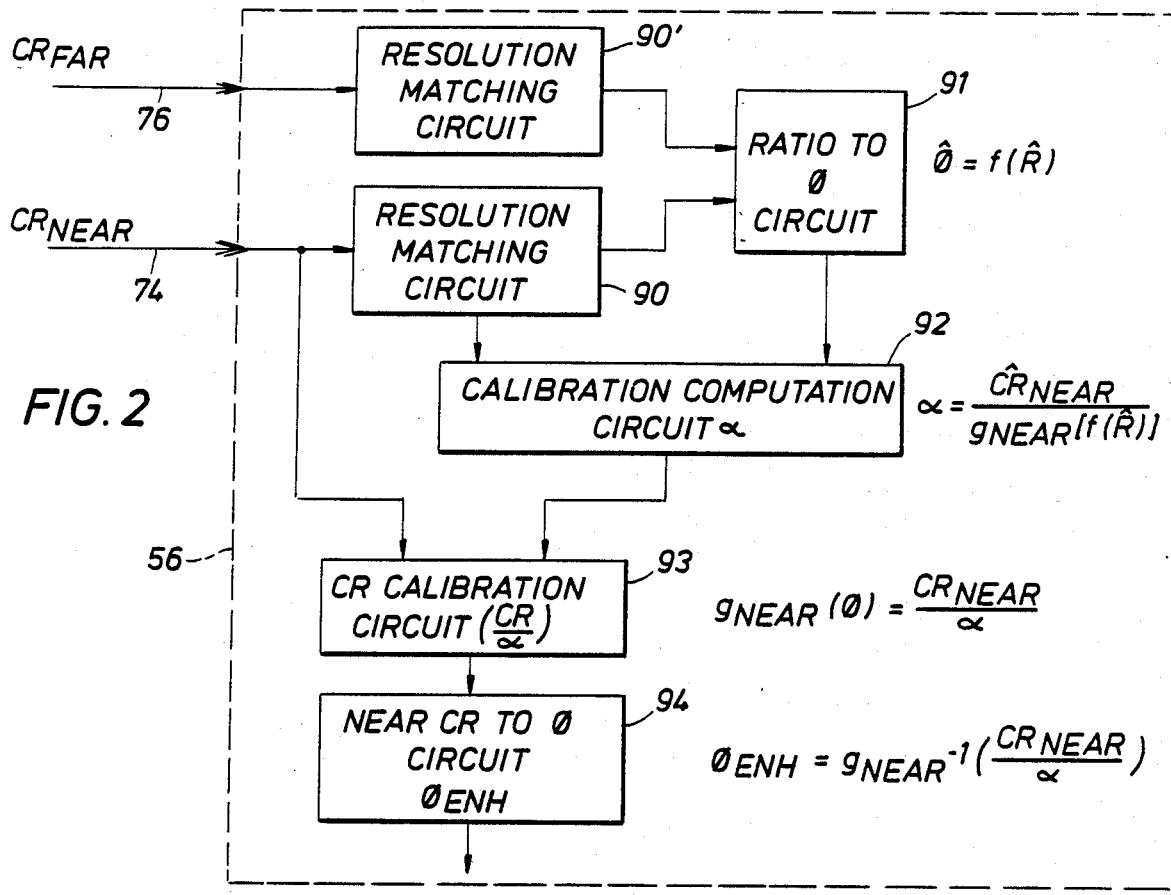
FIG. 2 is a schematic diagram of the circuit used to convert the neutron population measurements into porosity values.

With reference now to FIG. 2, a method for determining the porosity index of a subsurface geological formation 58 traversed by a borehole 54, will be described in connection with the surface processing circuitry 56 and the following equations. The pulses or generated sensor signals from the detectors 68 and 70, as is conventional in the art, are representative of the count rates of each detector 68, 70.

Count rates for each detector 68, 70 in the compensated neutron logging tool 200 have been measured in the laboratory and may be expressed as functions of porosity as follows:

$$\overline{CR}_{NEAR} = g_{NEAR}(\phi) \tag{1}$$

$$\overline{CR}_{FAR} = g_{FAR}(\phi) \tag{2}$$

where $\overline{CR}_{NEAR}$ and $\overline{CR}_{FAR}$ are the average count rates for the near and far detectors 68, 70; $g_{NEAR}(\phi)$ is the near detector porosity-response function; and $g_{FAR}(\phi)$ is the far detector porosity-response function. Equations (1) and (2) represent the responses of the two detectors 68, 70 for ideal conditions, since laboratory formations are precisely drilled, homogenous, non-bedded, experimental constructions containing a single fluid. In a real borehole 54, the count rates generally do not match those from the laboratory; however, they may be expressed in the forms:

$$CR_{NEAR} = g_{NEAR}(\phi) \cdot \alpha_{NEAR}(x_1, x_2, \ldots, x_j) \tag{3}$$

$$CR_{FAR} = g_{FAR}(\phi) \cdot \alpha_{FAR}(x_1, x_2, \ldots, x_j) \tag{4}$$

wherein $CR_{NEAR}$ is the actual near detector count rate, $CR_{FAR}$ is the actual far detector count rate; $\alpha$ is a continuous calibration function for enhanced resolution processing, which will be hereinafter described in greater detail; and $x_j$'s are symbolic of various uncontrolled environmental factors such as mudcake and salinity in the borehole 54. In this context, the functional behavior of the $\alpha$ functions is expected to be such that their variance, with depth, will usually be less rapid than the variance of porosity.

Normal processing of compensated neutron logging data is based upon the premise that, to a first approximation $\alpha_{NEAR} = \alpha_{FAR}$ so that:

$$CR_{NEAR} = g_{NEAR}(\phi) \cdot \alpha \tag{5}$$

$$CR_{FAR} = g_{FAR}(\phi) \cdot \alpha \tag{6}$$

The foregoing equations may be converted to a ratio R of near- to far-detector counting rates, or $$R = \frac{\overline{CR}_{NEAR}}{\overline{CR}_{FAR}} \approx \frac{CR_{NEAR}}{CR_{FAR}} = \frac{g_{NAME}(\phi)}{g_{FAR}(\phi)} \tag{7}$$

from which the foregoing ratio R, the porosity, $\phi$, can be computed by way of a functional relationship:

$$\phi = f(R) \tag{8}$$

For sensor signals, or count rates, from the detectors 68, 70 which have been previously resolution matched, as will be hereinafter described in greater detail, equation (5) and (6) can be rewritten to provide the following equations:

$$\hat{CR}_{NEAR} = g_{NEAR}(\hat{\phi}) \cdot \alpha \tag{9}$$

$$\hat{CR}_{FAR} = g_{FAR}(\hat{\phi}) \cdot \alpha \tag{10}$$

where $\hat{CR}_{NEAR}$ is the resolution matched count rate from the near detector 68; $\hat{CR}_{FAR}$ is the resolution matched count rate from the far detector 70. $\hat{\phi}$ is the porosity index from the ratio of resolution matched count rates, $\hat{CR}$, and is typically expressed as a fraction. The porosity index from the ratio of resolution matched count rates, $\hat{\phi}$, may be obtained by substituting the ratio of the resolution matched count rates, $\hat{R}$, into equation 8, so that, $$\hat{\phi} = f(\hat{R}) \tag{11}$$

With regard to the foregoing equations, it should be noted that $g_{NEAR}$ and $g_{FAR}$ are functions of a particular tool, such as compensated neutron logging tool 200, and these functions may be readily determined under laboratory conditions as is well/known in the art. Equations (9) and (11) thus contain two unknowns, $\hat{\phi}$ and $\alpha$ and may be solved in closed form to determine $\hat{\phi}$ and $\alpha$. Equation (10) could also be used, but the results would be identical since equation (10) is not independent of the other two equations, equations (9) and (11). Thus, $$\alpha = \frac{\hat{CR}_{NEAR}}{g_{NEAR}(f(\hat{R}))} \tag{12}$$

Once $\alpha$ has been determined, it can be substituted into equation (5), together with the actual near detector 68 count rate, $CR_{NEAR}$ to provide the following equation:

$$\frac{CR_{NEAR}}{\alpha} = g_{NEAR}(\phi) \tag{13}$$

Equations (5) or (13) can then be inverted to compute an enhanced resolution neutron porosity index, $\phi_{ENH}$, which, when averaged over several levels of the formation 58, is equivalent to the ratio porosity, $\phi_R$. The enhanced resolution neutron porosity index $\phi_{ENH}$, which is typically expressed as a fraction, has been shown to have the vertical resolution and statistical accuracy of the near detector 68.

With reference now to FIG. 2, the method of the present invention for determining a porosity index, having enhanced resolution, will be described in further detail. As previously described, the sensor signal from the near and far detectors, 68, 70, or count rates, $CR_{NEAR}$, $CR_{FAR}$ are transmitted to the surface processing circuitry 56 through two conductors 74, 76 respectively, in the armored cable 52, after discrimination against noise and amplification. The generated sensor signals, or count rates, then have their vertical resolution matched by resolution matching circuits 90, 90'. Circuits 90, 90' typically include an averaging filter, which degrades the apparent vertical resolution of the signal from the near detector 68 to be the same as the vertical resolution of the far detector 70. In general, both signals, or count rates are applied to different, separate filters in circuits, 90, 90', so the outputs of each circuit 90, 90' both have the same vertical resolution. Dependent upon the output signal of the detectors, or the signal sensors, 68, 70, it would be possible to use only one averaging filter in circuit 90; however, it is preferred to use two averaging filters, one disposed within each circuit 90, 90'. Thus, if the vertical response characteristics of a detector 68, 70 are known, it is well/known in the art how to utilize two averaging filters to match the vertical resolution of the output signals. It should be noted that the output signal of circuit 90 is expressed by equation (9) and the output of circuit 90' is expressed by equation (10), previously described. The output of circuits 90, 90', or the resolution matched count rates, $\hat{CR}$, are fed into circuit 91, or the ratio to $\phi$, circuit. Circuit 91 determines an environmentally compensated porosity index $\hat{\phi}$ from the ratio of the resolution matched count rates $\hat{R}$. The environmentally compensated porosity index $\hat{\phi}$, determined by circuit 91 corresponds to equation (11), wherein $$\hat{R} = \frac{\hat{CR}_{NEAR}}{\hat{CR}_{FAR}} \tag{14}$$

and $\hat{CR}_{NEAR}$ and $\hat{CR}_{FAR}$ are the two resolution matched sensor signals from circuits 90, 90'.

The output of the ratio to $\phi$ circuit 91, or the environmentally compensated porosity index $\hat{\phi}$, and the output of circuit 90, or the resolution matched sensor signal, or count rate $\hat{CR}_{NEAR}$ from the near detector 68 are then passed into the continuous calibration factor computation circuit 92. Circuit 92 thus determines the continuous calibration factor $\alpha$ in accordance with equation (12). The output of continuous calibration factor computation circuit 92 is then passed into a count rate calibration circuit 93 which also has the actual, unaveraged count rate $CR_{NEAR}$ passed therein and which count rate, $CR_{NEAR}$ has not been resolution matched. The count rate calibration circuit 93 thus calibrates the unmatched sensor signal or count rate $CR_{NEAR}$, from the near detector 68 in accordance with equation (13). The output of circuit 93 is then passed to a near count rate to $\phi$ circuit 94 which operates in accordance with the following equation (15) to determine an enhanced resolution neutron porosity index $\phi_{ENH}$, wherein the vertical resolution of the porosity index $\phi_{ENH}$, is enhanced. The equation which governs circuit 94 is:

$$\phi_{ENH} = g_{NEAR}^{-1}\left(\frac{CR_{NEAR}}{\alpha}\right) \tag{15}$$

As is conventional in the art, the output from circuit 94 may be transmitted to a conventional recorder in order to produce, or generate, a graph, or tangible representation, of the enhanced resolution porosity index, $\phi_{ENH}$, as a function of borehole depth.

With respect to compensated neutron logging tools, 200, count rates from the far detector 70 are usually more affected by gas in the subsurface geological formation 58, than the near detector 68 count rates because the far detector 70 "reads" more deeply into the formation 58. Simulation and laboratory data have shown that when gas is present in the formation 58, the continuous calibration factor $\alpha$ will have a value smaller than expected for a normal water filled formation. It has also been determined that other variations in the continuous calibration factor, from those expected from a normal water filled formation, may also indicate logging conditions in the borehole 54, such as logging tool 200 sticking, rugosity, or tool standoff. Further, logging data from older wells can be reevaluated in accordance with the present method, insofar as no new logging measurements are required to obtain the enhanced resolution neutron porosity index. All that is required are the actual, unaveraged count rates from the near and far detector 68, 70, which data is typically stored and has been previously obtained.

Figure 2A:
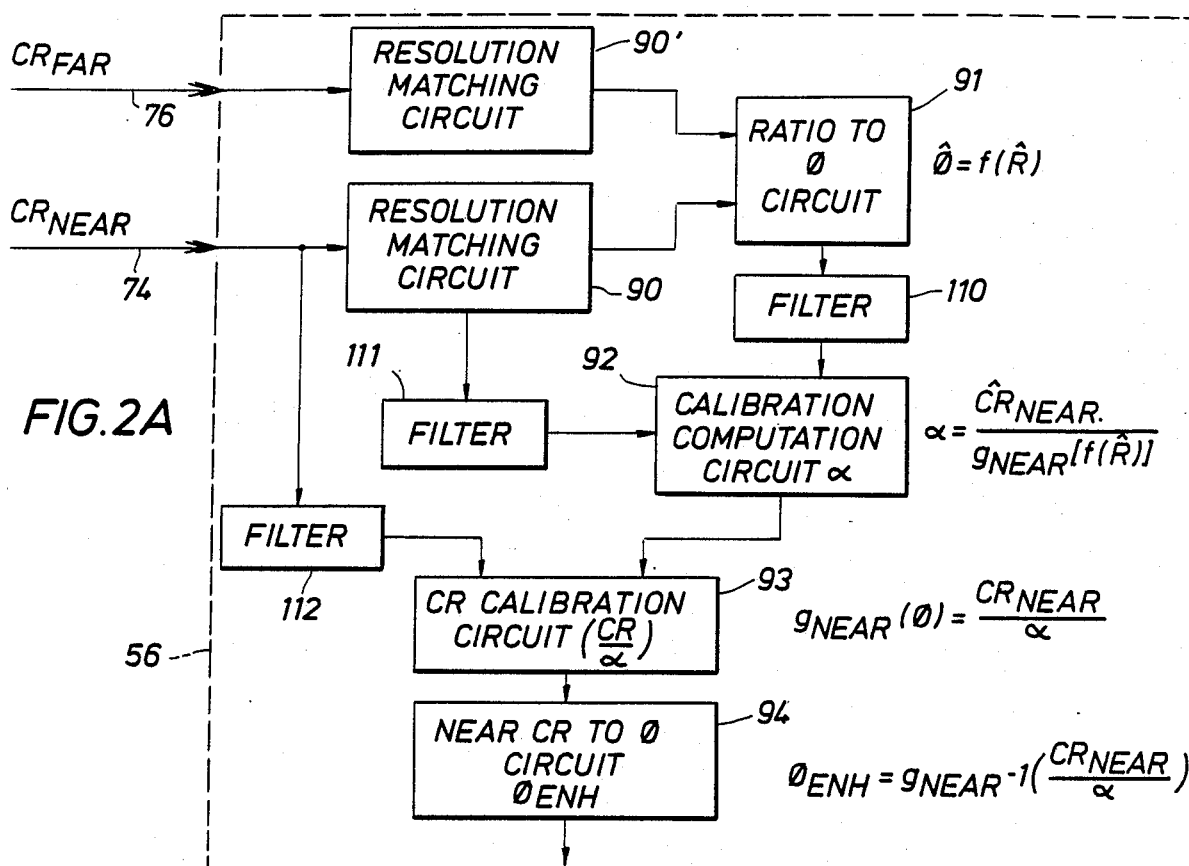
FIG. 2A is a schematic diagram of the preferred circuit used to convert the neutron population measurements into porosity values.

With reference now to FIG. 2A, the preferred method of the present invention for determining a porosity index, having enhanced statistical precision, without degrading vertical resolution, will be described in further detail. As previously described, the sensor signal from the near and far detectors, 68, 70, or count rates, $CR_{near}$, $CR_{Far}$ are transmitted to the surface processing circuitry 56 through two conductors 74, 76 respectively, in the armored cable 52, after discrimination against noise and amplification. The generated sensor signals, or count rates, then have their vertical resolution matched by resolution matching circuits 90, 90'. Circuits 90, 90' typically include an averaging filter, which degrades the apparent vertical resolution of the signal from the near detector 68 to be the same as the vertical resolution of the far detector 70. This further improves the statistical precision of the near detector signal. In general, both signals, or count rates are applied to different, separate filters in circuits, 90, 90', so the outputs of each circuit 90, 90' both have the same vertical resolution. Dependent upon the output signal of the detectors, or the signal sensors, 68, 70, it would be possible to use only one filter circuit 90; however, it is preferred to use two filters, one disposed within each circuit 90 and 90'. Thus, if the vertical response characteristics of a detector 68, 70 are known, it is well-known in the art how to utilize two filters to match the vertical resolution of the output signals. It should be noted that the output signal of circuit 90 is expressed by equation (9) and the output of circuit 90' is expressed by equation (10), previously described. The output of circuits 90, 90', or the resolution matched count rates, $\hat{CR}$, are fed into circuit 91, or the ratio to $\phi$, circuit. Circuit 91 determines an environmentally compensated porosity index $\hat{\phi}$ from the ratio of the resolution matched count rates $\hat{R}$. The environmentally compensated porosity index $\hat{\phi}$, determined by circuit 91 corresponds to equation (11), wherein $$R = \frac{\hat{CR}_{near}}{\hat{CR}_{far}} \tag{14}$$

and $CR_{Near}$ and $CR_{Far}$ are the two resolution matched sensor signals from circuits 90, 90'.

The output of the ratio to $\phi$ circuit 91, or the environmentally compensated porosity index $\hat{\phi}$, is passed through circuit 110 to apply additional filtering to improve statistical precision at the expense of vertical resolution. The output of circuit 90 is passed through a filtering circuit 111 which matches the vertical resolution to the output of 110. The signal from 74 is also passed through a "light" filter circuit 112 which may, but does not have to be identical to circuit 90. The output of circuits 110 and 111 are then passed into the continuous calibration factor computation circuit 92. Circuit 92 thus determines the continuous calibration factor $\alpha$ in accordance with equation (12). The output of continuous calibration factor computation circuit 92 is then passed into a count rate calibration circuit 93 which also has the "light" filtered count rate $CR_{Near}$ from circuit 112 passed therein. The count rate calibration circuit 93 thus calibrates the "light" filtered sensor signal or count rate $CR_{Near}$, from the near detector 68 in accordance with equation (13). The output of circuit 93 is then passed to a near count rate to $\phi$ circuit 94 which operates in accordance with the following equation (15) to determine an enhanced statistical precision neutron porosity index $\phi_{ENH}$, wherein the statistical precision of the porosity index $\phi_{ENH}$, is enhanced without degrading the vertical resolution. The equation which governs circuit 94 is:

$$\phi_{ENH} = g_{near}^{-1}\left(\frac{CR_{near}}{\alpha}\right) \tag{15}$$

As is conventional in the art, the output from circuit 94 may be transmitted to a conventional recorder in order to produce, or generate, a graph, or tangible representation, of the enhanced statistical precision porosity index $\phi_{ENH}$, as a function of borehole depth.

It should also be noted that the particular arrangement given of circuits 90, 90', 110, 111, and 112 is only one of the possibilities which will yield the desired result. Other possibilities can include single circuits combining several of these circuits and the order can be rearranged; for example, filter circuit 110 can be placed between circuits 90 and 91 instead of after circuit 91, in which case circuit 111 will not be required. In this case, a single circuit can replace the function of 90' and 110 combined, and another single circuit can replace 90 and 110 combined.

With respect to compensated neutron logging tool, 200, count rates from the far detector 70 are usually more affected by gas in the subsurface geological formation 58 than the near detector 68 count rates because the far detector 70 "reads" more deeply into the formation 58. Simulation and laboratory data have shown that when gas is present in the formation 58, continuous calibration factor $\alpha$ will have a value different than expected for a normal water filled formation. It has also been determined that other variations in the continuous calibration factor, from those expected from a normal water filled formation, may also indicate logging conditions in the borehole 54, such as logging tool 200 sticking, rugosity, or tool standoff. Further, logging data from older wells can be reevaluated in accordance with the present method, insofar as no new logging measurements are required to obtain the enhanced resolution neutron porosity index. All that is required are the actual, unaveraged count rates from the near and far detector 68, 70, which data is typically stored and has been previously obtained.

Figure 3:
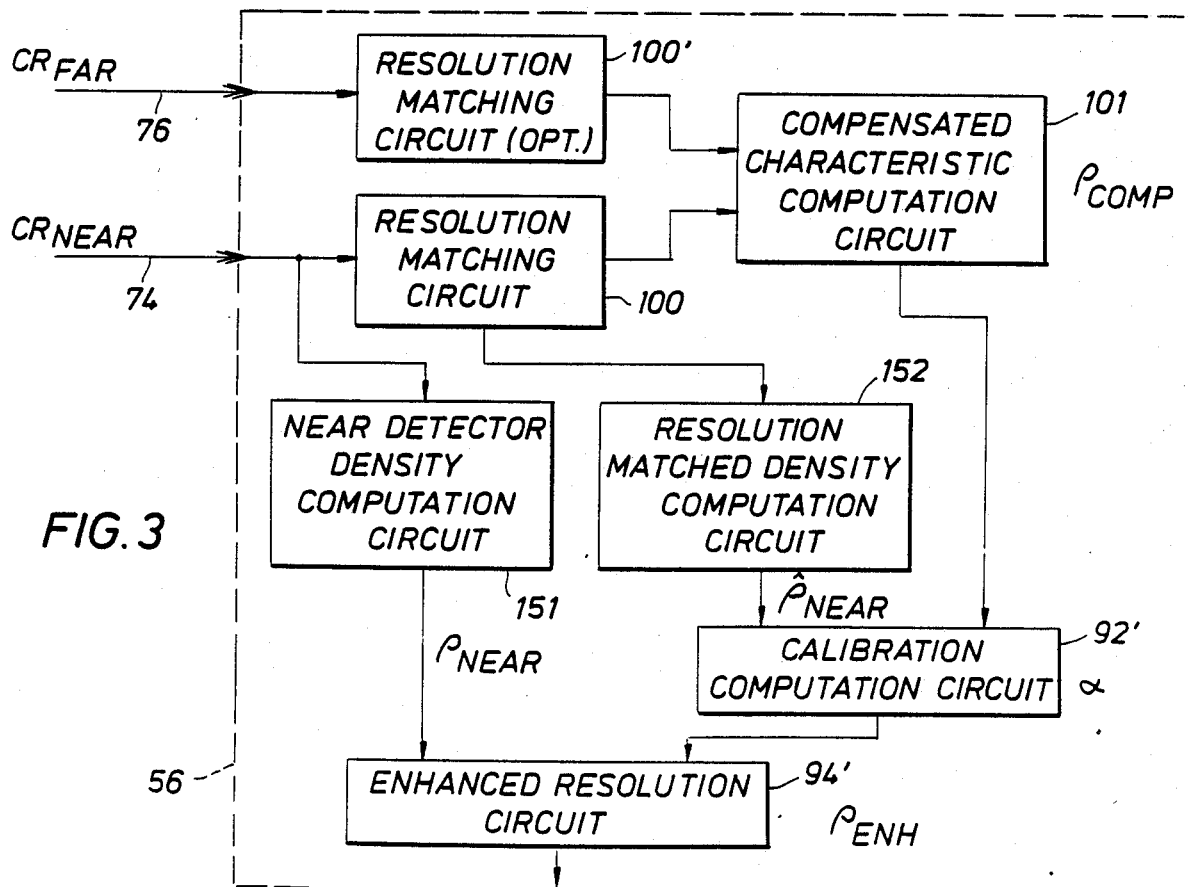
FIG. 3 is a schematic diagram of the circuit used to convert gamma radiation measurements into density values.

With reference now to FIGS. 3-7, a method of the present invention for determining the density, $\rho$, of a subsurface geological formation 58 traversed by a borehole 54 will be described. As previously set forth, the structure of a suitable dual-detector gamma radiation bulk density tool is structurally the same as that of tool 200 (FIG. 1), previously described, insofar as a dual-detector gamma radiation bulk density tool would also utilize a signal source, or gamma radiation source, and two signal sensors, or detectors. The detectors would be spaced different distances from the gamma radiation source, and each signal sensor would generate a sensor signal which is transmitted via an armored cable to the surface processing circuitry 56 previously described. Thus, as seen in FIG. 3, the sensor signal of the near detector and far detector 68, 70 are carried by conductors 74, 76 as previously described in connection with FIG. 2. In accordance with the invention, the desired enhanced density of the formation 58 $\rho_{ENH}$ may be expressed by the following equation:

$$\rho_{ENH} = \rho_{comp} + \rho_{near} - \hat{\rho}_{near} \tag{16}$$

wherein $\rho_{comp}$ is the environmentally compensated density of the formation 58 when utilizing the signal outputs of both the near and far detectors; $\rho_{near}$ is the density computed from the actual, unaveraged signal, or count rate, of the near detector 68; and $\hat{\rho}_{near}$ is the density computed from the resolution matched signal, or count rate, from the near detector.

This enhanced density, $\rho_{ENH}$, may also be expressed by the following equation:

$$\rho_{ENH} = \hat{\rho}_{near} + \alpha \tag{17}$$

wherein $\alpha$ is a continuous calibration factor and is equal to the environmentally compensated density, $\rho_{comp}$, minus the resolution matched density of the near detector, $\hat{\rho}_{near}$.

With reference now to FIG. 3, appropriate circuitry will be described to accomplish the method of the present invention for determining the density of a subsurface geological formation 58, and the circuitry will be also described graphically with reference to FIGS. 4-7. The sensor signals from the near and far detectors 68, 70, carried by conductors 74, 76 first have their vertical resolution matched as by passing the signals through an appropriate filter associated with resolution matching circuits 100, 100'. In this regard, whereas it was preferred to utilize two filters, with the resolution matching circuits 90, 90' of FIG. 2, it is possible to only utilize one filter when determining the density of a formation. Thus, it is preferred that the filter used to match the vertical resolution of the sensor signals from the near and far detectors 68, 70, be associated with the resolution matching circuit 100 for the sensor signal from the near detector 68 which is carried by conductor 74. Thus, resolution-matching circuit 100' is optional.

The resolution matched sensor signals from resolution matching circuits 100, 100' are then transmitted to a compensated characteristic computation circuit 101, wherein the environmentally compensated density $\rho_{comp}$ is determined in a conventional manner from the resolution matched sensor signals from circuits 100, 100'. With respect to FIG. 4, the curve 101' represents the environmentally compensated density from the near and far detectors, which is the output of circuit 101. Curve 150 is representative of the true value of the density of a particular formation located at a particular depth and represents an ideal response from an "ideal" tool.

Figure 5:
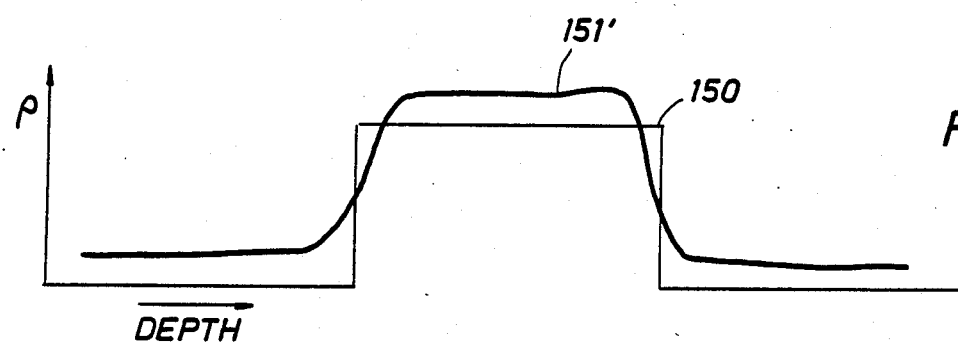
Figure 6:
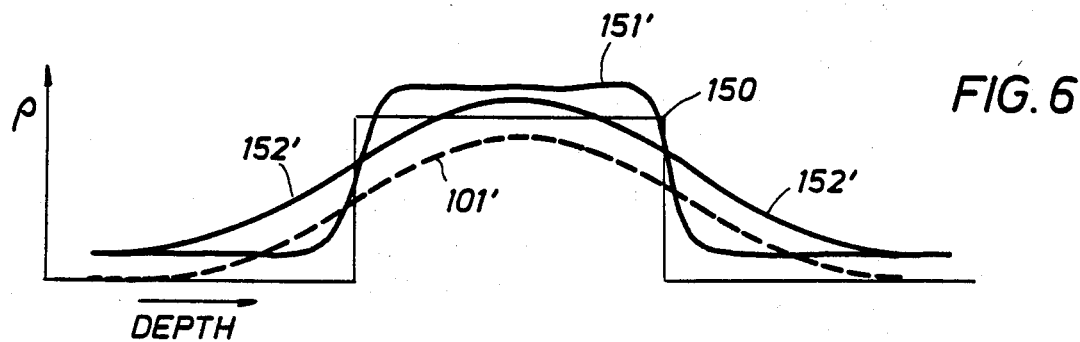
Figure 7:
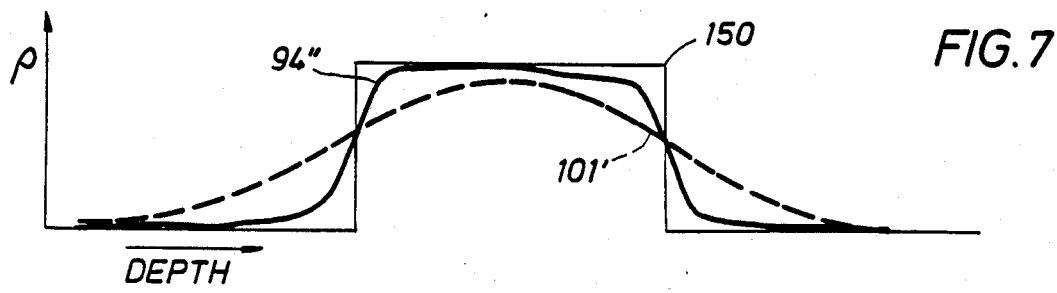

Still with reference to FIGS. 3-7, the density from the unmatched sensor signal from the near detector 68 is then determined by a near detector density computation circuit 151 which is graphically illustrated in FIGS. 5 and 6 by curve 151'. The density from the resolution matched sensor signal from the near detector from resolution matching circuit 100 is then determined by a near detector, resolution matched density computation circuit 152. The resolution matched density $\hat{\rho}_{near}$ is illustrated by curve 152' in FIG. 6. The continuous calibration factor $\alpha$ may then be determined by calibration computation circuit 92' by determining the numerical difference between the environmentally compensated density, $\rho_{comp}$, from the circuit 101 and the resolution-matched density, $\hat{\rho}_{near}$, from circuit 152. In accordance with equation (17), the continuous calibration factor may then be combined in enhanced resolution circuit 94' with the actual density of the near detector from circuit 151 to provide the enhanced density, $\rho_{ENH}$, wherein the vertical resolution of the density determination is enhanced. The enhanced density is illustrated by a curve 94" in FIG. 7 wherein it may be compared with the environmentally compensated density from the near and far detector, $\rho_{comp}$, and it can be seen that the resolution, or clarity, of the enhanced density value is better graphically illustrated.

With reference now to FIGS. 3A-7, a method of the present invention for determining the density, $\rho$, of a preferred subsurface geological formation 58 traversed by a borehole 54 will be described. As previously set forth, the structure of a suitable dual-detector gamma radiation bulk density tool is structurally the same as that of tool 200 (FIG. 1), previously described, insofar as a dual-detector gamma radiation bulk density tool would also utilize a signal source, or gamma radiation source, and two signal sensors, or detectors. The detectors would be spaced different distances from the gamma radiation source, and each signal sensor would generate a sensor signal which is transmitted via an armored cable to the surface processing circuitry 56 previously described. Thus, as seen in FIG. 3, the sensor signal of the near detector and far detector 68, 70 are carried by conductors 74, 76 as previously described in connection with FIG. 2. In accordance with the invention, the desired enhanced density of the formation 58 $\rho_{ENH}$ may be expressed by the following equation:

$$\rho_{ENH} = \rho_{comp} + \rho_{near} - \hat{\rho}_{near} \tag{16}$$

wherein $\rho_{comp}$ is the environmentally compensated density of the formation 58 when utilizing the signal outputs of both the near and far detectors; $\rho_{near}$ is the density computed from the actual, lightly filtered signal, or count rate, of the near detector 68; and $\hat{\rho}_{near}$ is the density computed from the heavily filtered signal, or count rate, from the near detector.

This enhanced density, $\rho_{ENH}$, may also be expressed by the following equation:

$$\rho_{ENH} = \hat{\rho}_{near} + \alpha \tag{17}$$

wherein $\alpha$ is a continuous calibration factor and is equal to the filtered environmentally compensated density, $\rho_{comp}$, minus the filtered density of the near detector, $\hat{\rho}_{near}$.

Figure 3A:
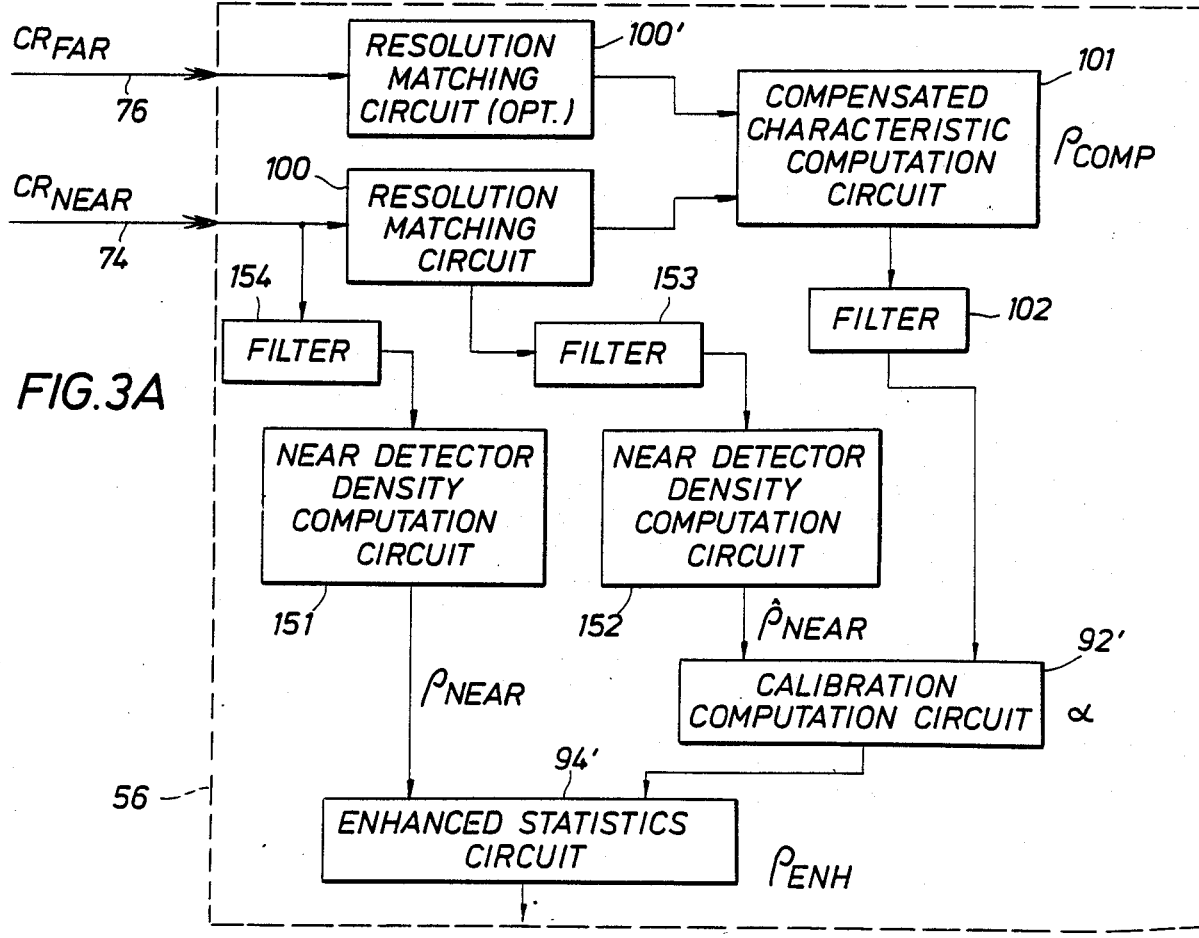
FIG. 3A is a schematic diagram of the preferred circuit used to convert gamma radiation measurements into density values.
Figure 4:
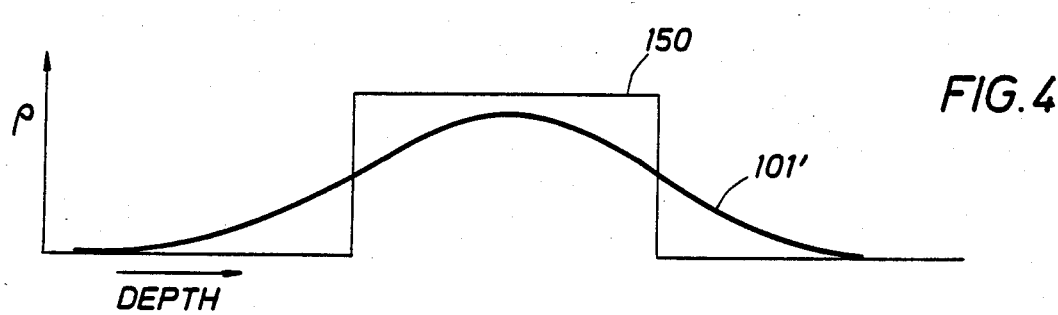
FIGS. 4-7 are graphs representative of various density readings versus depth, and illustrate a method of the present invention.

With reference now to FIG. 3A, appropriate circuitry will be described to accomplish the method of the present invention for determining the density of a subsurface geological formation 58, and the circuitry will be also described graphically with reference to FIGS. 4-7. The sensor signals from the near and far detectors 68, 70, carried by conductors 74, 76 first have their vertical resolution matched as by passing the signals through an appropriate filter associated with resolution matching circuits 100, 100'. In this regard, whereas it was preferred to utilize two filters, with the resolution matching circuits 90, 90' of FIG. 2, it is possible to only utilize one filter when determining the density of a formation. Thus, it is preferred that the filter used to match the vertical resolution of the sensor signals from the near and far detectors 68, 70, be associated with the resolution matching circuit 100 for the sensor signal from the near detector 68 which is carried by conductor 74. Thus, resolution-matching circuit 100' is optional.

The resolution matched sensor signals from resolution matching circuits 100, 100' are then transmitted to a compensated characteristic computation circuit 101, wherein the environmentally compensated density $\rho_{comp}$ is determined in a conventional manner from the resolution matched sensor signals from circuits 100, 100'. This result is then passed through another filter, circuit 102, to improve statistical precision. With respect to FIG. 4, the curve 101' represents the filtered environmentally compensated density from the near and far detectors, which is the output of circuit 102. Curve 150 is representative of the true value of the density of a particular formation located at a particular depth and represents an ideal response from an "ideal" tool.

Still with reference to FIGS. 3A-7 the raw sensor signal from near detector 68 is passed through "light" filter circuit 154, which can be, but does not have to be, identical to circuit 100. The density from the near detector 68 is then determined by passing the output of filter 154 to a near detector density computation circuit 151 which is graphically illustrated in FIGS. 5 and 6 by curve 151'. The resolution matched near detector signal from 100 is passed through an additional filter circuit 153, which matches the vertical resolution to that of the output of 102. The density from the filtered sensor signal from the near detector from filtering circuit 153 is then determined by a near detector, density computation circuit 152. The filtered density $\hat{\rho}_{near}$ from circuit 152 is illustrated by curve 152' in FIG. 6. The continuous calibration factor $\alpha$ may then be determined by calibration computation circuit 92' by determining the numerical difference between the filtered environmentally compensated density, $\rho_{comp}$, from the circuit 102 and the filtered density, $\hat{\rho}_{near}$, from circuit 152. In accordance with equation (17), the continuous calibration factor may then be combined in enhanced statistical precision circuit 94' with the actual density of the near detector from circuit 151 to provide the enhanced density, $\rho_{ENH}$, wherein the statistical precision of the density determination is enhanced without degrading the vertical resolution. The enhanced density is illustrated by a curve 94" in FIG. 7 wherein it may be compared with the environmentally compensated density from the near and far detector, $\rho_{comp}$, and it can be seen that the resolution, or clarity, of the enhanced density value is better graphically illustrated.

As with the porosity index determinations previously described in connection with FIG. 2, the output of circuit 94' may be transmitted to a suitable recorder to produce or generate, a graph, or tangible representation, of the enhanced density.

As with the compensated neutron logging tool, the use of the term "near detector" is used to describe a detector conventionally used in various logging tools, and is not meant to encompass non-operational detectors, or sensors, or detectors which are not disposed with respect to the signal source to achieve the optimum signal from the signal from the signal sensor.

As with the porosity index determination previously described in connection with FIG. 2, the various filters can be arranged and combined in a number of equivalent ways.

Although the embodiments previously described utilize only a near and far detector 68, 70, it should be noted that additional far detectors 70', 70", could be utilized with near detector 68.

As with the method for determining a porosity index for a formation, logging data from older wells can be reevaluated in accordance with the present method, insofar as no new logging measurements are required to obtain the enhanced resolution density of a formation. All that is required are the original output signals from the near and far detectors, which data is typically stored for older wells.

It is to be understood that the invention is not limited to the exact details of construction, operation, exact materials or embodiment shown and described as obvious modifications and equivalents will be apparent to one skilled in the art; for example, the method for determining a characteristic of a subsurface geological formation could also be applied to pairs of resistivity measurements obtained from conventional dual-induction tools, such tools being supplied with, or without, a dipmeter. Accordingly, the invention is therefore to be limited only by the scope of the appended claims.

I claim:

1. A method for determining a characteristic of a subsurface geological formation traversed by a borehole, comprising the steps of:
   (a) passing a logging tool through the borehole, the logging tool having associated therewith a signal source and at least two signal sensors spaced from the signal source by different distances;
   (b) transmitting a signal from the signal source into the subsurface geological formation;
   (c) generating sensor signals from the at least two signal sensors in response to the signal from the signal source received by the at least two signal sensors, said sensor signals exhibiting differences in quality of attributes therebetween as a function of their respective spacing from said source;
   (d) combining said sensor signals so as to enhance the quality of an attribute of one of said sensor signals based on the better quality of the same attribute of said other one of said sensor signals;
   (e) determining said formation characteristic from the enhanced sensor signal.

2. The method of claim 1 wherein said attribute is vertical resolution.

3. The method of claim 1 wherein said attribute is statistical precision.

4. The method of claim 1 wherein said formation characteristic is density.

5. The method of claim 1 wherein said formation characteristic is porosity.

6. A method for determining a characteristic of a subsurface geological formation traversed by a borehole, comprising the steps of:
   (a) passing a logging tool through the borehole, the logging tool having associated therewith a nuclear signal source and at least two signal sensors spaced from the signal source by different distances;
   (b) transmitting a signal from the signal source into the subsurface geological formation;
   (c) generating sensor signals from said sensors in response to the signal from the signal source, said sensor signals exhibiting differences in quality of attributes therebetween as a function of their respective spacing from said source;
   (d) deriving, from one of said sensor signals, a third signal which represents a characteristic of said formation, said third signal exhibiting differences in quality of attributes from said one sensor signal; and
   (e) combining said third signal and a selected one of said sensor signals to derive a compensated formation characteristic having enhanced attributes.

7. The method of claim 6 wherein said attribute is vertical resolution.

8. The method of claim 7 wherein said selected sensor is the sensor nearest the source.

9. The method of claim 6 wherein said attribute is statistical precision.

10. The method of claim 9 wherein said selected sensor is the sensor nearest the source.

11. The method of claim 6 wherein said formation characteristic is density.

12. The method of claim 11 wherein said selected sensor is the sensor nearest the source.

13. The method of claim 6 wherein said formation characteristic is porosity.

14. The method of claim 13 wherein said selected sensor is the sensor nearest the source.

15. The method of claim 6 wherein said third signal is derived from a combination of said two sensor signals for compensation for environmental effects.

16. The method of claim 6 wherein said first and second sensor signals are count rates.

17. The method of claim 16 wherein said characteristic is formation density.

18. The method of claim 6 wherein said third signal is a formation characteristic related to the formation's interaction with neutrons.

19. The method of claim 18 wherein said characteristic is formation porosity.

20. The method of claim 6 wherein said enhanced signal is a formation characteristic related to the formation's interaction with neutrons, with vertical resolution similar to that of the count rate signal from a selected one of said sensor signals.

21. The method of claim 6 wherein said nuclear signal source is a neutron source.

22. The method of claim 6 wherein said nuclear signal source is a gamma ray source.

23. The method of claim 6 wherein said selected sensor is the sensor nearest the source.

24. A method for determining a characteristic of a subsurface geological formation traversed by a borehole, comprising the steps of:
  (a) passing a logging tool through the borehole, the logging tool having associated therewith a nuclear signal source and at least two signal sensors spaced from the signal source by different distances;
  (b) transmitting a signal from the signal source into the subsurface geological formation;
  (c) generating count rate signals from said sensors in response to the signal from the signal source, said count rate signals exhibiting differences in quality of attributes therebetween as a function of their respective spacing from said source;
  (d) deriving, from one of said count rate signals, a third signal which represents a characteristic of said formation, said third signal exhibiting differences in quality of attributes from said sensor signals; and
  (e) combining said third signal and a selected one of said count rate signals to derive a compensated formation characteristic having enhanced attributes.

25. The method of claim 24 wherein said attribute is vertical resolution.

26. The method of claim 25 wherein said selected count rate signal is the signal from the sensor nearest the source.

27. The method of claim 24 wherein said attribute is statistical precision.

28. The method of claim 27 wherein said selected count rate signal is the signal from the sensor nearest the source.

29. The method of claim 24 wherein said formation characteristic is density.

30. The method of claim 29 wherein said selected count rate signal is the signal from the sensor nearest the source.

31. The method of claim 24 wherein said formation characteristic is porosity.

32. The method of claim 31 wherein said selected count rate signal is the signal from the sensor nearest the source.

33. The method of claim 24 wherein said third signal is derived from a combination of said two sensor count rate signals for compensation for environmental effects.

34. The method of claim 24 wherein said third signal is a formation characteristic related to the formation's interaction with neutrons.

35. The method of claim 24 wherein said enhanced signal is a formation characteristic related to the formation's interaction with neutrons, with vertical resolution similar to that of the count rate signal from a selected one of said sensor count rate signals.

36. The method of claim 24 wherein said selected count rate signal is the signal from the sensor nearest the source.

37. The method of claim 24 wherein said nuclear signal source is a neutron source.

38. The method of claim 24 wherein said nuclear signal source is a gamma ray source.

39. A method for determining a characteristic of a subsurface geological formation traversed by a borehole, comprising the steps of:
  (a) passing a logging tool through the borehole, the logging tool having associated therewith a nuclear signal source and at least two signal sensors spaced from the signal source by different distances;
  (b) transmitting a signal from the signal source into the subsurface geological formation;
  (c) generating sensor signals from said sensors in response to the signal from the signal source, said sensor signals exhibiting differences in quality of attributes therebetween as a function of their respective spacing from said source;
  (d) deriving, from one of said sensor signals, a third signal which represents a characteristic of said formation, said third signal exhibiting differences in quality of attributes from said one sensor signal;
  (e) deriving from said one of said sensor signals, a fourth signal which represents the same characteristic of said formation, said fourth signal exhibiting differences in quality of attributes from both said one sensor signal and said third signal; and
  (f) combining said third signal and said fourth signal to derive a compensated formation characteristic having enhanced attributes.

40. The method of claim 39 wherein said attribute is vertical resolution.

41. The method of claim 40 wherein said selected sensor is the sensor nearest the source.

42. The method of claim 39 wherein said attribute is statistical precision.

43. The method of claim 42 wherein said selected sensor is the sensor nearest the source.

44. The method of claim 39 wherein said formation characteristic is density.

45. The method of claim 44 wherein said selected sensor is the sensor nearest the source.

46. The method of claim 39 wherein said formation characteristic is porosity.

47. The method of claim 46 wherein said selected sensor is the sensor nearest the source.

48. The method of claim 39 wherein said third signal is derived from a combination of said two sensor signals for compensation for environmental effects.

49. The method of claim 48 wherein said characteristic is formation density.

50. The method of claim 39 wherein said first and second sensor signals are count rates.

51. The method of claim 39 wherein said third signal is a formation characteristic related to the formation's interaction with neutrons.

52. The method of claim 51 wherein said characteristic is formation porosity.

53. The method of claim 39 wherein said enhanced signal is a formation characteristic related to the formation's interaction with neutrons, with vertical resolution similar to that of the count rate signal from a selected one of said sensor signals.

54. The method of claim 39 wherein said nuclear signal source is a neutron source.

55. The method of claim 39 wherein said nuclear signal source is a gamma ray source.

56. The method of claim 39 wherein said selected sensor is the sensor nearest the source.

57. A method for determining a characteristic of a subsurface geological formation traversed by a borehole, comprising the steps of:
  (a) passing a logging tool through the borehole, the logging tool having associated therewith a nuclear signal source and at least two signal sensors spaced from the signal source by different distances;
  (b) transmitting a signal from the signal source into the subsurface geological formation;
  (c) generating count rate signals from said sensors in response to the signal from the signal source, said count rate signals exhibiting differences in quality of attributes therebetween as a function of their respective spacing from said source;
  (d) deriving, from one of said count rate signals, a third signal which represents a characteristic of said formation, said third signal exhibiting differences in quality of attributes from said sensor signals;
  (e) deriving from said one of said count rate signals, a fourth signal which represents the same characteristic of said formation, said fourth signal exhibiting differences in quality of attributes from both said one count rate signal and said third signal; and
  (f) combining said third signal and a selected one of said count rate signals to derive a compensated formation characteristic having enhanced attributes.

58. The method of claim 57 wherein said attribute is vertical resolution.

59. The method of claim 58 wherein said selected count rate signal is the signal from the sensor nearest the source.

60. The method of claim 57 wherein said attribute is statistical precision.

61. The method of claim 60 wherein said selected count rate signal is the signal from the sensor nearest the source.

62. The method of claim 57 wherein said formation characteristic is density.

63. The method of claim 62 wherein said selected count rate signal is the signal from the sensor nearest the source.

64. The method of claim 57 wherein said formation characteristic is porosity.

65. The method of claim 64 wherein said selected count rate signal is the signal from the sensor nearest the source.

66. The method of claim 57 wherein said third signal is derived from a combination of said two sensor count rate signals for compensation for environmental effects.

67. The method of claim 57 wherein said third signal is a formation characteristic related to the formation's interaction with neutrons.

68. The method of claim 57 wherein said enhanced signal is a formation characteristic related to the formation's interaction with neutrons, with vertical resolution similar to that of the count rate signal from a selected one of said sensor count rate signals.

69. The method of claim 57 wherein said selected count rate signal is the signal from the sensor nearest the source.

70. The method of claim 57 wherein said nuclear signal source is a neutron source.

71. The method of claim 57 wherein said nuclear signal source is a gamma ray source.

* * * * *